United States Patent [19]

Gut, deceased et al.

[11] 4,317,253
[45] Mar. 2, 1982

[54] ROTARY BRUSH DRIVE PROTECTOR

[75] Inventors: Stanley J. Gut, deceased, late of Wayne, N.J., by Lillian Gut, executrix; Don W. Vermillion, Anderson, S.C.

[73] Assignee: The Singer Company, Stamford, Conn.

[21] Appl. No.: 122,772

[22] Filed: Feb. 19, 1980

[51] Int. Cl.³ .............................................. A47L 9/04
[52] U.S. Cl. ........................................ 15/390; 15/391; 64/30 E; 192/30 W; 192/56 R
[58] Field of Search .................... 15/390, 389, 391; 64/30 E; 192/56 L, 56 R, 30 W

[56] References Cited

U.S. PATENT DOCUMENTS

| 2,302,110 | 11/1942 | Dow et al. | 64/30 E |
| 2,570,585 | 10/1951 | Murphy | 192/56 L |
| 2,637,987 | 5/1953 | Hill et al. | 192/56 R X |
| 3,682,010 | 8/1972 | Brooks et al. | 15/390 X |
| 3,786,776 | 1/1974 | Buthe et al. | 192/30 W X |

*Primary Examiner*—Chris K. Moore
*Attorney, Agent, or Firm*—James M. Trygg; Robert E. Smith; Edward L. Bell

[57] ABSTRACT

An override clutch device is disclosed for use in a vacuum cleaner having a powered rotary brush. The override clutch device is arranged such that should the torque require to rotate the brush exceeds a predetermined level, the drive mechanism is disengaged from the brush thereby allowing the drive belt to continue to operate without damage. An audible signal is emitted to alert the operator of the malfunction.

1 Claim, 4 Drawing Figures

ROTARY BRUSH DRIVE PROTECTOR

BACKGROUND OF THE INVENTION

It is a customary practice in the vacuum cleaner industry to provide a powered rotary brush having rows of stiff bristles for loosening and helping to pick up dirt and other debris. The rotary brush is generally driven by the impeller motor through a flexible drive belt. Necessarily, the impeller motor is quite powerful in relation to the power required for driving the brush roller and it runs at a fairly high rate of speed necessitating a very small diameter driving pulley and a relatively large driven pulley. With this construction should the rotary brush become stalled or its speed of rotation reduced, the drive belt will then slip on the small drive pulley resulting in overheating of the belt and possible damage thereto.

There are relatively sophisticated electromagnetic or electronic devices in use today for recognizing the malfunction and cutting off power to the motor or decoupling the roller from the drive motor. See for example U.S. Pat. No. 4,099,291, July 11, 1978, Bowerman which discloses a vacuum cleaner having a torque limiting magnetic drive device, the input side of which is driven directly by the fan motor, and the output side of which drives the brush roller. This magnetic drive is supported independent of the brush roller, transmitting its driving force thereto through a drive belt. The purpose of the device is to prevent damage should the brush roller stall or become overloaded. In addition, see U.S. Pat. No. 4,163,999, Aug. 7, 1979, Eaton et al which is assigned to the assignee of the present invention and the teachings of which are incorporated herein by reference. Eaton discloses an upright vacuum cleaner having a powered brush roller of the type described above and a Hall Effect device for measuring the rotational speed of the brush roller. When that speed falls below some predetermined minimum level, the power to the motor is automatically shut off thereby preventing damage to the belt.

In both Bowerman and Eaton there is no provision for a signal to the operator warning of the malfunction. Thus, the operator may not be immediately aware of the reduced performance of the vacuum cleaner. Additionally, both these constructions employ rather sophisticated electronic or electromechanical devices. The present invention overcomes these difficulties by the use of a relatively simple mechanical device.

The above citations comprise what the applicant believes to be the closest art of which he is aware that is relevant to the examination of this application.

SUMMARY OF THE INVENTION

It is an object of this invention to produce a rotary brush drive coupling device that will disengage the drive motor from a jammed or stalled brush thereby permitting the motor to continue to run without the substanting damage. It is another objective of this invention to produce a rotary brush drive coupling device that, when the rotary brush becomes jammed or stalled, will emit an audio signal, audible over the normal noises of a operating vacuum cleaner to signal the operator of a malfunction.

Other objects and advantages of the invention will become apparent through reference to the accompanying drawings and descriptive matter which illustrate a preferred embodiment of this invention.

According to the present invention there is provided a vacuum cleaner having a powered rotary brush, a flexible drive belt for transmitting rotary motion from a motor to the brush, and an override clutch means interposed between the drive belt and the brush. When the torque required to rotate the brush exceeds a predetermined level, the override clutch means will decouple and allow the drive belt to continue to operate without damage. A signal means provides an audible signal when this occurs thereby alerting the operator of the malfunction.

BRIEF DESCRIPTION OF THE DRAWINGS

In order that the invention be more fully understood, it will now be described by way of example with reference to the accompanying drawings in which.

DESCRIPTION OF THE PREFERRED EMBODIMENT

Figure 1:
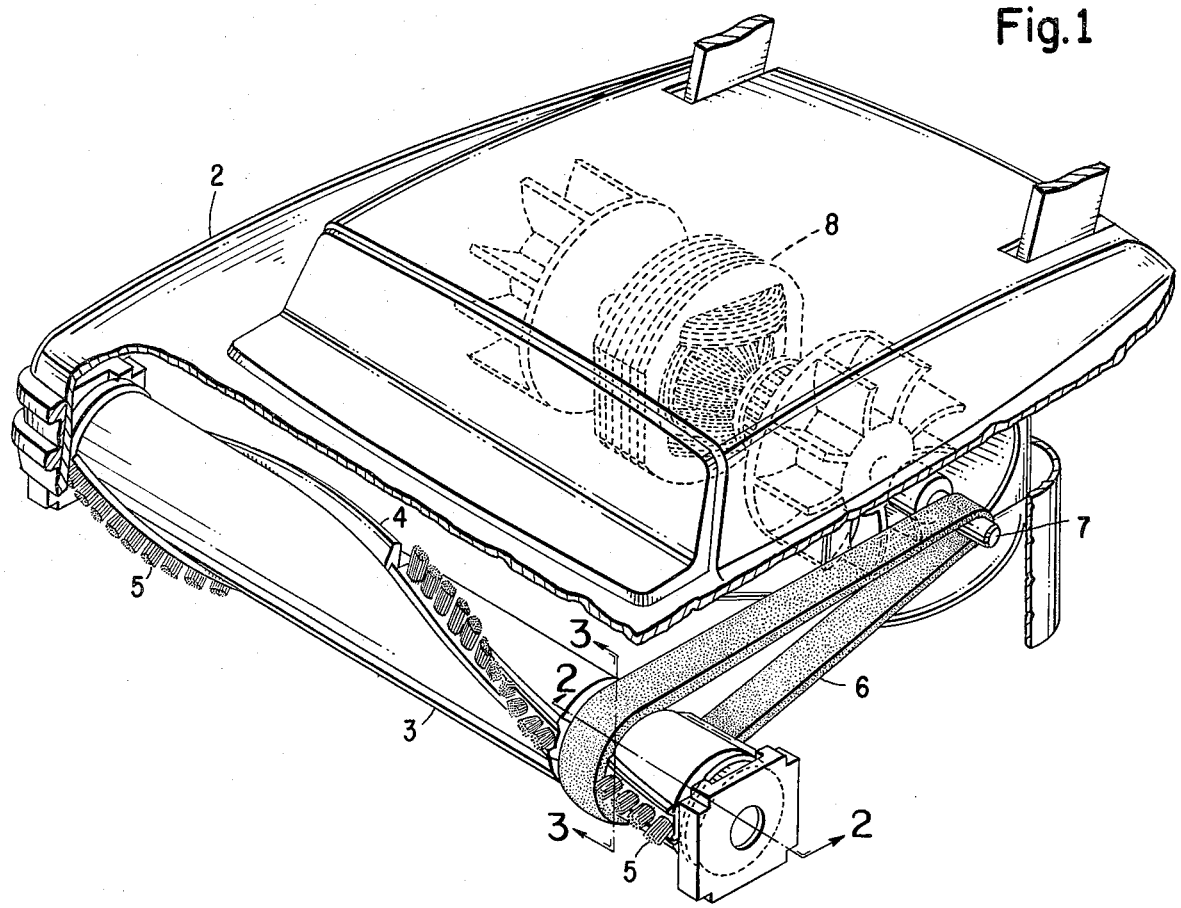
FIG. 1 is a cutaway perspective view of a vacuum cleaner showing a rotary brush and belt drive assembly incorporating this invention.
Figure 2:
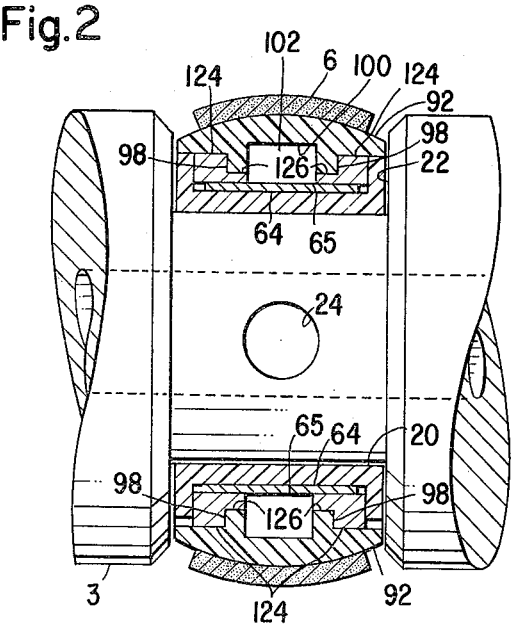
FIG. 2 is a cross section view of the rotary brush and override clutch assembly substantially taken along lines 2—2 of FIG. 1.
Figure 3:
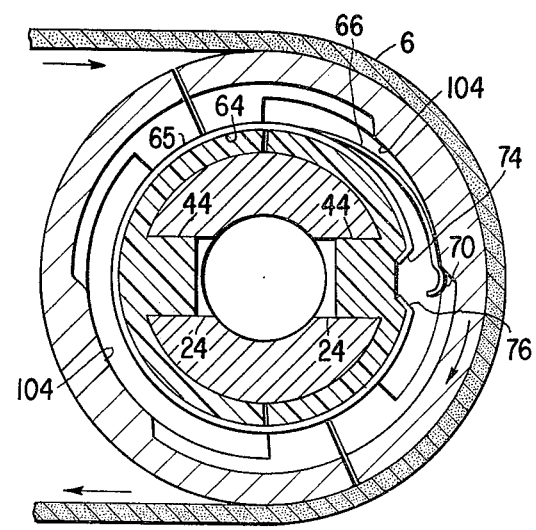
FIG. 3 is an axial cross section of the rotary brush and override clutch assembly taken substantially along lines 3—3 of FIG. 1.
Figure 4:
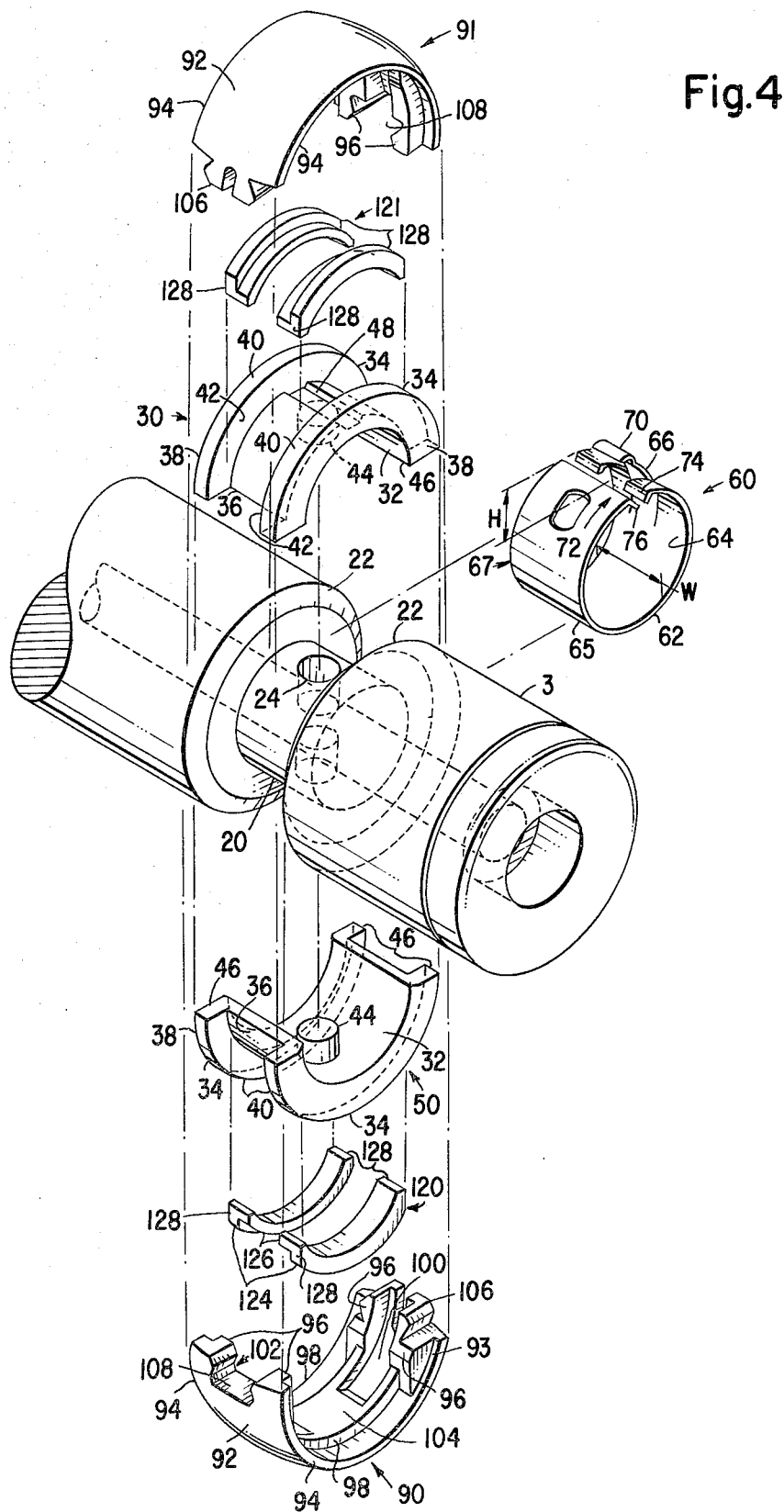
FIG. 4 is an exploded perspective view of the override clutch assembly illustrating a preferred embodiment of this invention.

Referring to FIGS. 1 through 6, there is shown a vacuum cleaner having a housing 2, a powered rotary brush 3 journalled in the housing 2, a drive motor 8 which includes, by way of example but not limitation, motors powered by electricity, air, fluid, vacuum or the like and having a belt pulley 7, and a flexible drive belt 6 coupling the belt pulley 7 and the powered rotary brush 3 for imparting rotation thereto. The rotary brush 3 has a beater bar 4 and brush bristles 5 attached thereto, an undercut 20 formed in its outer surface having orthogonally formed side walls 22 and a drive hole 24 formed in a surface of the undercut 20 and extending through the brush roller 3. There are two hub segments, an upper hub segment 30 and a lower hub segment 50, each having an inner diameter 32 formed to closely fit the undercut 20, a pair of flanges 34 formed orthogonal to the inner diameter 32 and projecting radially outward, and a pair of end faces 46. Each flange 34 has a flange outer face 38 which permits the hub segments 30 and 50 to closely fit within the undercut 20. The flanges 34 having flange outer diameters 40, when assembled to the brush roller 3 lie completely within the undercut 20. The flange outer diameter 40 is substantially less than the diameter of the rotary brush 3 and the flange outer faces 38 lie adjacent to the side walls 22 of the brush roller 3. A drive post 44 is formed on the inner diameter 32 of each of the hub segments 30 and 50 and projects radially inward for engagement with the drive hole 24 of the brush roller 3.

A split ring 60 having an annular body 62, an inner diameter 64, an outer diameter 65, and width W is formed to closely encircle the outer diameter 36 of the assembled hub segments 30 and 50. The width W of the split ring 60 is such that it loosely fits between the flange inner faces 42 of the hub segments 30 and 50. A leaf spring member 66 having a deformable end 70 projects radially outward from the surface of the annular body 62 at 67 leaving a cutout 68. There are two tabs 74 formed on either side of the cutout 68 and adjacent to the split 72. On the other side of the split 72 there is another tab 76 formed thereon. All three tabs, 74 and 76, project inwardly and are adapted to frictionally engage the depression 48 in the hub segment 30 thereby providing a rigid rotatable assembly of the brush roller 3, the hub segments 30 and 50 and the split ring 60.

The interlocking pulley segments 90 and 91 each have a spherical outer surface 92 adapted to engage a flexible drive belt. Each of the pulley segments 90 and 91 have a pair of flat parallel side faces 94 and an inside diameter 93 from which projects inwardly four cleats 96 and a pair of locating side rails 98. The cleats 96 and the locating side rails 98 of the interlocking pulley segments 90 and 91 form an annular cavity 102 having a smooth cylindrical surface 100. There is a boss 104 projecting inwardly from the smooth cylindrical surfaces 100 of the interlocking pulley segments 90 and 91 thus forming a discontinuity in the otherwise smooth surface 100. There is an interlocking projection 106 and a mating interlocking depression 108 formed in the extremities of each of the pulley segments 90 and 91. When the pulley segments 90 and 91 are assembled, the interlocking projection 106 of one segment mates with and tightly engages the interlocking depression 108 of the other pulley segment thus forming a continuous ring shape pulley having a spherical outer surface.

There are two pairs of bearing inserts, shown at 120 and 121, each having an arcuate bearing race 122, an outer diameter 124, a locating undercut 126 and two end faces 128. The end faces are spaced such that the bearing inserts fit between the cleats 96 of the interlocking pulley segments 90 and 91 and the undercuts 126 locate against and embrace the locating side rails 98. Thus the bearing inserts 120 and 121 are constrained stationary relative to the assembled interlocking pulley segments 90 and 91. The arcuate bearing race surfaces 122 of each pair of bearing inserts 120 and 121 are adapted to closely correspond to and ride on the outer diameter 65 of the split ring 60. This permits the assembled interlocking pulley segments 90 and 91 to rotate with respect to the split ring 60.

The deformable end 70 of the split ring 60 projects into the annular cavity 102 defined by the interlocking pulley segments 90 and 91. As relative rotation takes place between the interlocking pulley segments 90 and 91 and the rotary brush 3, the deformable end 70 engages the boss 104 projecting out of the smooth cylindrical surface 100 within the annular cavity 102 thereby effecting a mechanical couple between the pulley segments 90 and 91 and the brush roller 3 permitting them to rotate as a single assembly.

In operation should the brush roller 3 become jammed and fail to rotate, the deformable end 70 which is in frictional contact with the boss 104 will be forced radially inward thereby depressing the leaf spring member 66 until the deformable end 70 rides on the inner surface of the boss 104 thereby clearing it and permitting the pulley segments 90 and 91 to continue to rotate. Each time the boss 104 engages deformable end 70, depresses the leaf spring member 66 and then releases the deformable end 70, an audible clicking sound is created. As rotation of the interlocking pulley segments continue, the clicking sounds will act as a warning signal to the operator of a malfunction.

The construction described above results in several advantages. Since the speed differential between the motor and the brush roller is, in most household vacuum cleaners, of the order of from 3:1 to 5:1, integration of the override clutch into the brush roller permits the clutch to operate at the lower speed. This in turn results in a much simpler mechanical device than would otherwise be necessary. Due to its simplicity of construction the clutch disclosed in this application is easily and economically manufactured. Additionally, it lends itself to retrofit to existing vacuum cleaners now in use; since the clutch is wholly contained within the confines of the brush roller, a brush roller having this invention incorporated therein is completely interchangeable with a standard brush roller of the same type.

Upon reviewing the present disclosure, a number of alternative constructions will occur to one skilled in the art. Such constructions may have various combinations of deformable ends that engage a discontinuity such as a boss or depression in a smooth cylindrical surface thereby effecting a frictional couple between the two elements and creating an override clutch device. Such alternative constructions are considered to be within the spirit and scope of this disclosure.

What is claimed is:

1. In a vacuum cleaner having a motor; a rotary brush; a flexible drive belt for transmitting rotary motion from said motor to said brush, said drive belt encircling said brush; an override clutch means interposed between said drive belt and said brush for decoupling said drive belt from said brush and providing an audible signal to the operator when the torque required to rotate said brush exceeds a predetermined level thereby allowing said drive belt to continue to operate without damage should said brush jam and become stalled and alerting the operator of the malfunction; wherein said override clutch means comprises:
   a. a belt pulley journalled to rotate with respect to said rotary brush and adapted to frictionally engage said drive belt for rotation thereby; and
   b. a coupling means for positively coupling said belt pulley to said rotary brush for mutual simultaneous rotation including;
      1. an inner diameter of said belt pulley having a boss formed on an otherwise smooth cylindrical surface and projecting radially inwardly, said inner diameter being substantially concentric to said rotation of said belt pulley;
      2. a spring member attached to said rotary brush and adapted to rotate therewith having a deformable end which is urged into engagement with said discontinuity in said inner diameter by a predetermined level of radially directed force;
      3. said discontinuity being formed such that when said relative torque exceeds said predetermined level said deformable end disengages said discontinuity;
   wherein said belt pulley comprises a plurality of mutually interlocking segments.

* * * * *